United States Patent
Payton et al.

(10) Patent No.: US 7,809,630 B2
(45) Date of Patent: Oct. 5, 2010

(54) METHOD AND SYSTEM FOR PRIORITIZING A BIDDER IN AN AUCTION

(75) Inventors: David W. Payton, Calabasas, CA (US); Cory W. Peichel, Richardson, TX (US)

(73) Assignee: Raytheon Company, Waltham, MA (US)

( * ) Notice: Subject to any disclaimer, the term of this patent is extended or adjusted under 35 U.S.C. 154(b) by 401 days.

(21) Appl. No.: 11/537,226

(22) Filed: Sep. 29, 2006

(65) Prior Publication Data

US 2008/0082425 A1    Apr. 3, 2008

(51) Int. Cl.
*G06Q 40/00* (2006.01)

(52) U.S. Cl. .......................... 705/37; 705/26

(58) Field of Classification Search ............... 705/37, 705/26, 27, 1, 35, 80, 14; 370/442, 443
See application file for complete search history.

(56) References Cited

U.S. PATENT DOCUMENTS

| | | | |
|---|---|---|---|
| 5,654,968 A | | 8/1997 | Smiroldo |
| 5,721,735 A | | 2/1998 | Smiroldo |
| 6,055,518 A | * | 4/2000 | Franklin et al. ............... 705/37 |
| 6,151,589 A | * | 11/2000 | Aggarwal et al. ......... 705/36 R |
| 6,161,099 A | * | 12/2000 | Harrington et al. ........ 705/36 R |
| 6,199,050 B1 | * | 3/2001 | Alaia et al. ................... 705/37 |
| 6,223,167 B1 | * | 4/2001 | Alaia et al. ................... 705/37 |
| 2002/0107787 A1 | * | 8/2002 | Mashinsky et al. ............ 705/37 |
| 2003/0130930 A1 | * | 7/2003 | Miura et al. .................. 705/37 |
| 2005/0080707 A1 | * | 4/2005 | Glasspool ..................... 705/37 |
| 2005/0144587 A1 | * | 6/2005 | Bryant ........................ 717/111 |

OTHER PUBLICATIONS

Anonymous "The Complete Turnaround( Oftel says BT will have to offer services at most 'popular' exchanges first, in contrast to original plan, which was to make least popular exchanges available for colocation first )" Nov. 2000 Communications International , p. 79.*
Welling, Kathryn M "A Master of Market Structure" Dec. 1, 2003 Traders Magazine pp. 1.*
Anonymous, "Opinions Diverge on Commission's Reg NMS Proposal.( NASDAQ Market System )" Apr. 26, 2004 Securities Industry News.*
"National Security and Horizontal Integration"; AFCEA International; 2004; pp. 1-13.

* cited by examiner

*Primary Examiner*—Kelly Campen
(74) *Attorney, Agent, or Firm*—Baker Botts L.L.P.

(57) ABSTRACT

A method for conducting an auction includes allowing one or more bidders to each bid on one or more resources, and for each of the bidders: determining a priority level; calculating a bid rate interval; and regulating the relative likelihood of the bidder winning the auction. Calculating a bid rate interval is accomplished using at least the determined priority level of the bidder. Regulating the relative likelihood of the bidder winning the auction is accomplished by regulating, based at least on the calculated bid rate interval, the time between successive bids on the one or more resources made by the bidder.

10 Claims, 2 Drawing Sheets

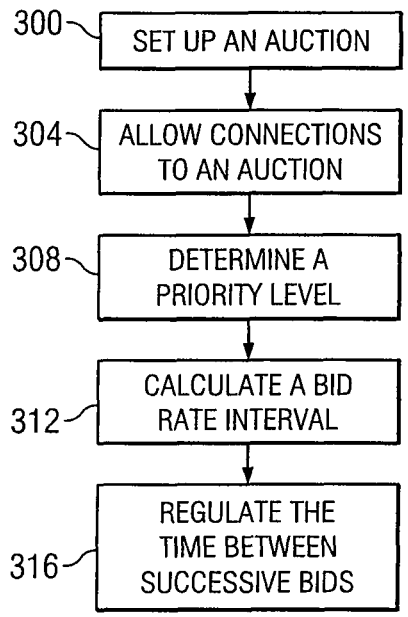
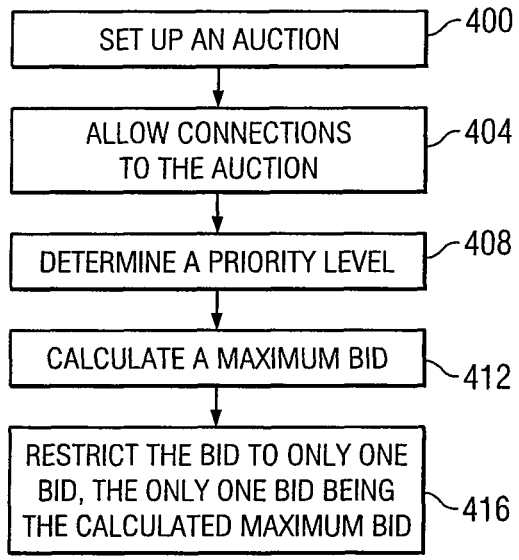
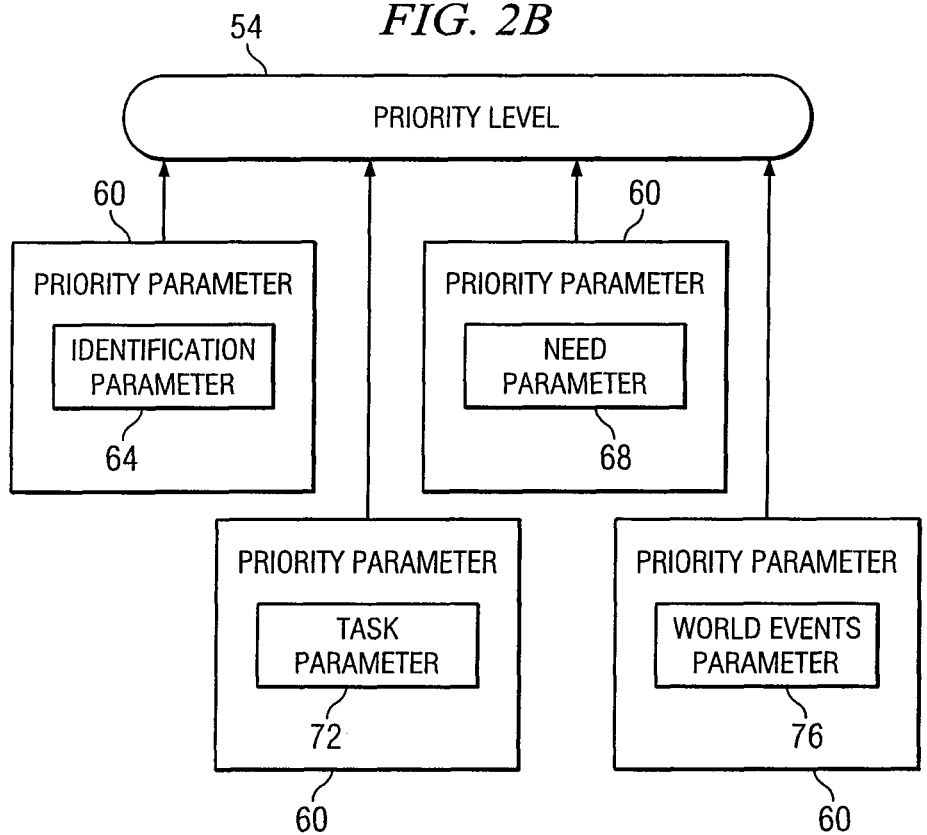

METHOD AND SYSTEM FOR PRIORITIZING A BIDDER IN AN AUCTION

TECHNICAL FIELD OF THE INVENTION

This invention relates generally to the field of auctions and more specifically to a method and system for prioritizing a bidder in an auction.

BACKGROUND OF THE INVENTION

Auctions traditionally consist of bidders bidding a single currency, such as money. In some instances, this can be combined with some level of priority, which allows a high priority bidder to win more readily than a lower priority bidder. This may be useful when one bidder has a higher level of importance than another bidder, thus allowing the more important bidder to win more readily than another bidder.

Standard processes for prioritizing bidders in an auction involve establishing different size bid increments for each bidder. These processes, however, have disadvantages. For example, establishing different size bid increments for each bidder assumes that all bidders are bidding synchronously with each other and in the case of fixed bidding, forces a high priority bidder to use a high amount of their bidding budget to bid on a resource very few bidders may be competing for.

SUMMARY OF THE INVENTION

In accordance with the present invention, disadvantages and problems associated with previous techniques for conducting an auction may be reduced or eliminated.

According to one embodiment of the present invention, a method for conducting an auction includes allowing one or more bidders to each bid on one or more resources, and for each of the bidders: determining a priority level; calculating a bid rate interval; and regulating the relative likelihood of the bidder winning the auction. Calculating a bid rate interval is accomplished using at least the determined priority level of the bidder. Regulating the relative likelihood of the bidder winning the auction is accomplished by regulating, based at least on the calculated bid rate interval, the time between successive bids on the one or more resources made by the bidder.

According to another embodiment of the present invention, a method of conducting an auction includes allowing one or more bidders to each bid on one or more resources, and for each of the bidders: restricting the bid on the one or more resources made by the bidder to only one bid; determining a priority level; calculating, using at least the determined priority level, a maximum bid; and using the calculated maximum bid as the only one bid. The method further includes determining a winning bid for the one or more resources by comparing the respective maximum bids of each of the bidders.

Certain embodiments of the invention may provide one or more technical advantages. A technical advantage of one embodiment may be that varying the interval between successive bids made by each bidder allows a bidder with a higher priority to bid more often on a resource. This may allow the high priority bidder a better chance of winning the auction without being forced to automatically bid high amounts for a resource with little to no competition. A further technical advantage of one embodiment of the invention may be that using need based factors as the main factors for calculating a maximum bid allows a bidder with a high need but a low priority level a better chance of winning the auction over a bidder with a low need but a high priority level.

Certain embodiments of the invention may include none, some, or all of the above technical advantages. One or more technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 2A is a flow chart illustrating one embodiment of a method used to conduct an auction where the interval between successive bids is varied for each user;

FIG. 2B is a block diagram illustrating one embodiment of a method used to conduct an auction where the interval between successive bids is varied for each user; and FIG. 3 is a flow chart illustrating one embodiment of a method used to conduct an auction where a maximum bid is determined for each user.

DETAILED DESCRIPTION OF EXAMPLE EMBODIMENTS OF THE INVENTION

Embodiments of the present invention and its advantages are best understood by referring to FIGS. 1 through 3 of the drawings, like numerals being used for like and corresponding parts of the various drawings.

Figure 1A:
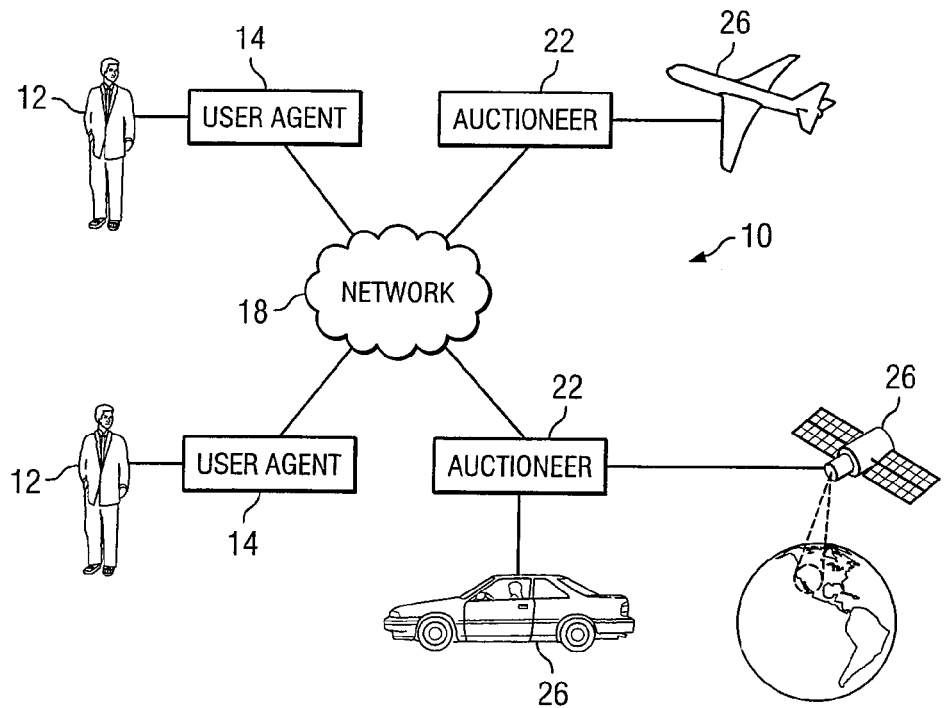
FIG. 1A is a block diagram illustrating one embodiment of a system used in conducting an auction.

FIG. 1A is a block diagram illustrating one embodiment of a system 10 used in conducting an auction. According to the illustrated embodiment, system 10 generally includes one or more user agents 14 accessible by one or more users 12, a network 18, one or more auctioneers 22, and one or more resources 26. In general, system 10 may allow user agents 14 to connect to auctioneer 22 so that users 12 may take part in an electronic auction for resources 26.

User agent 14 may refer to any suitable device capable of communicating with network 18 and further capable of allowing users 12 to bid on resources 26 in an auction. For example, user agent 14 may include a personal digital assistant, a computer such as a laptop, a cellular telephone, a mobile handset, or any other device capable of communicating with network 18 and further capable of allowing users 12 to bid on resources 26 in an auction. In the illustrated embodiment, user agent 14 refers to a computer. User 12 may refer to any suitable entity capable of using user agent 14 to bid on resources 26. For example, user 12 may include a person, a program, a device, an automation, or any other suitable entity, including combinations thereof.

Network 18 may refer to any interconnecting system capable of transmitting audio, video, signals, data, messages, or any combination of the preceding. Network 18 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise internet, or any other suitable communication link, including combinations thereof.

Auctioneer 22 may refer to any suitable device capable of communicating with network 18 and further capable of conducting an auction for resources 26. For example, auctioneer 22 may include a personal digital assistant, a computer, such as a laptop, a cellular telephone, a mobile handset, or any other device capable of communicating with network 18 and further capable of conducting an auction for resources 26. In the illustrated embodiment, auctioneer 22 refers to a computer.

Resource 26 may refer to any available resource or source of wealth. For example, resource 26 may include a mineral, a sensor, or an area of ownership. In one embodiment, resource 26 refers to a military resource. In the illustrated embodiment, resource 26 refers to a sensor. A sensor may include any suitable entity capable of performing a task. For example, a sensor may include a person, a truck, a plane, a satellite, or any other suitable entity capable of performing a task. In the illustrated embodiment, a sensor, thus resource 26, refers to a military truck, a military plane, and a military satellite.

In one embodiment, resource 26 may have associated classification levels. Classification levels are capable of restricting users 12 from bidding on resource 26 unless users 12 have an appropriate classification access. For example, a user 12 with a classification access lower than that required by a resource 26 would be unable to connect to auctioneer 22, using a user agent 14, in order to bid on the resource 26. In one embodiment, the classification level of each resource 26 is determined by auctioneer 22. In a further embodiment, the classification access of each user 12 is determined by auctioneer 22.

In the illustrated embodiment, user agent 14 is capable of connecting, using network 18, to auctioneers 22 for the purpose of allowing user 12 to bid on resources 26. Likewise, auctioneer 22 is capable of connecting, through network 18, to user agent 14 in order to conduct an auction for resources 26. User agent 14 and auctioneer 22 may have a wired, wireless, or other suitable connection to network 18.

Auctions traditionally consist of bidders bidding a single currency, such as money. In some instances, this can be combined with some level of priority, which allows a high priority bidder to win more readily than a lower priority bidder. This may be useful when one bidder has a higher level of importance than another bidder, thus allowing the more important bidder to win more readily than another bidder. The teachings of one aspect of the invention recognize that such priority bidding may be effected by varying the interval between successive bids made by each bidder, the interval between successive bids determined by the priority level of the bidder. Some prior art systems conduct an electronic auction for resources, but fail to teach varying the interval between successive bids made by each bidder so as to give a bidder priority over another bidder. Instead, the prior art merely discloses varying the size of the bid, thus a bidder with a higher priority may make a higher bid at each interval of bidding than a bidder with a low priority. Varying the size of the bid is designed to allow the bidder with a higher priority a better chance of winning the auction. Unfortunately, it both assumes that all bidders are bidding synchronously with each other and in the case of fixed bidding, forces a high priority bidder to use a high amount of their bidding budget to bid on a resource very few bidders may be competing for.

According to one aspect of the disclosure, embodiments of the present invention are capable of varying the interval between successive bids made by each bidder. This allows, in one embodiment, a bidder with a higher priority to bid more often on a resource, allowing the high priority bidder a better chance of winning the auction without being forced to automatically bid high amounts for a resource with little to no competition.

The teachings of another aspect of the invention recognize that in a fixed bid auction, a bidder with a high priority but a low need for a resource will usually win the auction for the resource when competing against bidders with a low priority but a very high need for the resource. Therefore, a bidder with a high priority is capable of abusing the auction system and monopolizing all available resources, no matter the need of other bidders. One aspect of the disclosure is capable of using need based factors as the main factors in determining the amount each bidder may bid for an available resource. In one embodiment, this allows a bidder with a high need but a low priority level a better chance of winning the auction over a bidder with a low need but a high priority level. Additional details of certain embodiments of the invention are described below with reference to FIGS. 1B through 3.

Figure 1B:
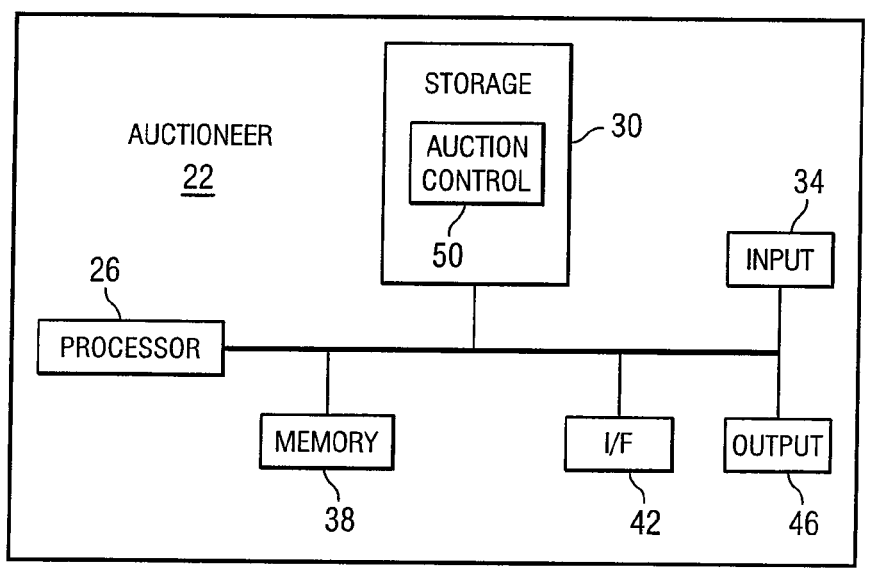
FIG. 1B is a block diagram illustrating one embodiment of the auctioneer of the system of FIG. 1A.

FIG. 1B is a block diagram illustrating one embodiment of auctioneer 22. In the illustrated embodiment, auctioneer 22 includes a processor 26, a storage device 30, an input device 34, a memory device 38, a communication interface 42, an output device 46, and an auction control 50. The components of auctioneer 22 may be coupled to each other in any suitable manner. In the illustrated embodiment, the components of auctioneer 22 are coupled to each other by a bus.

Processor 26 may refer to any suitable device capable of executing instructions and manipulating data to perform operations for auctioneer 22. For example, processor 26 may include any type of central processing unit (CPU). Storage device 30 may refer to any suitable device capable of storing data and instructions. Storage device 30 may include, for example, a magnetic disk, an optical disk, flash memory, or other suitable data storage device. Input device 34 may refer to any suitable device capable of inputting, selecting, and/or manipulating various data and information. For example, input device 34 may include a keyboard, mouse, graphics tablet, joystick, light pen, microphone, scanner, or other suitable input device. Memory device 38 may refer to any suitable device capable of storing and facilitating retrieval of data. For example, memory device 38 may include random access memory (RAM), read only memory (ROM), a magnetic disk, a disk drive, a compact disk (CD) drive, a digital video disk (DVD) drive, removable media storage, or any other suitable data storage medium, including combinations thereof.

Communication interface 42 may refer to any suitable device capable of receiving input for auctioneer 22, sending output from auctioneer 22, performing suitable processing of the input or output or both, communicating to other devices, or any combination of the preceding. For example, communication interface 42 may include appropriate hardware (e.g., modem, network interface card, etc.) and software, including protocol conversion and data processing capabilities, to communicate through a LAN, WAN, or other communication system that allows auctioneer 22 to communicate to other devices. Communication interface 42 may include one or more ports, conversion software, or both. Output device 46 may refer to any suitable device capable of displaying information to a user. For example, output device 46 may include a video display, a printer, a plotter, or other suitable output device.

Auction control 50 may refer to any suitable logic embodied in a computer-readable media, and when executed capable of conducting an auction for resources 26. In the illustrated embodiment of the invention, auction control 50 resides in storage device 30. In other embodiments of the invention, auction control 50 may reside in memory device 38, or any other suitable device operable to store and facilitate retrieval of data and instructions. Auction control 50 is discussed in further detail in reference to FIGS. 2A through 3.

FIGS. 2A and 2B illustrate one embodiment of system 10 in which system 10 is used to conduct an auction where the interval between successive bids is varied for each user 12. FIG. 3 illustrates an alternative embodiment of system 10 in which system 10 is used to conduct an auction where a maximum bid is determined for each user 12.

FIG. 2A is a flow chart illustrating a method of one embodiment of system 10. In the illustrated embodiment, the method of system 10 includes setting up an auction, allowing connections to the auction, determining a priority level, calculating a bid rate interval, and regulating the time between successive bids. The example acts may be performed by auctioneer 22, as discussed above with reference to FIGS. 1A and 1B, user agent 14, or by any other suitable device. FIG. 2B is a block diagram illustrating one step of the method of system 10 referenced in FIG. 2A.

At step 300 of FIG. 2A, an auction is set up. For example, the auction is established so as to accept bids for the use of resources 26. In one embodiment, the bidding process is set up for a limited amount of time, at the end of which, the highest bid wins the auction and resources 26. In a further embodiment, the auction is set up with a maximum bid increment. For example, user 12 is allowed to make multiple bids during the amount of time set up for the auction, however, each one of the bids may not be higher than the maximum bid increment. Therefore, because the bids made by multiple users 12 are limited to a maximum bid increment, a user 12 allowed to bid more frequently than the other users 12 has an increased chance of winning the auction for resources 26. In a further embodiment, user 12 does not have to bid the maximum bid increment. For example, user 12 may bid lower than the maximum bid increment.

At step 304, connections to the auction are allowed. For example, these connections may be made through network 18. Additionally, these connections are allowed in order for user agents 14 to allow users 12 to bid on resources 26 in an auction.

At step 308, a priority level is determined. According to the teachings of one aspect of the invention, a priority level is used to allow a bid rate interval to be calculated, with decreased bid rate intervals being allocated to higher priority users 12. Step 308 involves determining a priority level for a combination of a user 12 and a resource 26. Thus, a specific user 12 may have a higher priority level for one resource 26 than another resource 26. In the illustrated embodiment of FIG. 2B, a priority level 54 is determined for each user 12 using one or more priority parameters 60. Priority parameter 60 may include any data suitable for allowing auction control 50 to determine the priority level 54 for each user 12. For example, priority parameter 60 may include an identification parameter 64, a need parameter 68, a task parameter 72, and a world events parameter 76.

Identification parameter 64 may refer to any data that allows auctioneer 22 to appropriately identify each user 12. For example, identification parameter 64 may include an IP address, a military rank, a social security number, a security clearance level, or a level of political office held by user 12 of each user agent 14. In the illustrated embodiment, identification 64 includes a rank in the military. A higher rank in the military would correspond to a higher priority level 54.

Need parameter 68 may refer to the amount of need user 12 has for resources 26. In one embodiment, need parameter 68 may include any system operable to gauge the value of the need of user 12 for resources 26. For example, need parameter 68 may include a numbering system made up of numbers 1-10; the number 1 symbolizing an immediate need for resources 26, and the number 10 symbolizing no immediate need for resources 26. In the illustrated embodiment, each user 12 determines their own need parameter 68 for resources 26.

Task parameter 72 may refer to any objective user 12 has for resources 26. For example, task parameter 72 may include taking a picture, flying a route, or compiling data. In the illustrated embodiment, task parameter 72 includes a military objective. For instance, task parameter 72 includes scanning a proposed battlefield for possible threats. In the illustrated embodiment, task parameter 72 may further include details such as the duration of time user 12 needs resources 26, the area where user 12 intends to use resources 26, or the reason user 12 needs resources 26. Additionally, in the illustrated embodiment, each user 12 determines their own task parameter 72.

World events parameter 76 may refer to any significant world events occurring at the time the auction takes place. For example, world events parameter 76 may include a war, a coup, a political event, or a natural disaster. In one embodiment, when task parameter 72 determined by user 12 corresponds with world events parameter 76, user 12 may receive a higher priority level 54. Likewise, when task parameter 72 determined by user 12 does not correspond with world events parameter 76, user 12 may receive a lower priority level 54.

In a further embodiment, priority parameter 60 may include any other suitable parameter. For example, priority parameter 60 may include a proximity parameter. A proximity parameter may refer to the distance between user 12 and resources 26. In one embodiment, when user 12 is close in proximity to resources 26, user 12 may receive a high priority level 54. Alternatively, when user 12 is not close in proximity to resources 26, user 12 may receive a low priority level 54.

In one embodiment, resource 26 may refer to a military plane capable of performing reconnaissance over a future battle ground. The priority level 54 for a specific user 12, such as a General in the military, may be a function of the identification parameter 64, the need parameter 68, the task parameter 72, and the world events parameter 76. For example, identification parameter 64 may include a military ranking, such as General in the military, the General's need parameter 68 for the military plane may be immediate, the General's task parameter 72 for the military plane may be for reconnaissance of a planned incursion route, and world events parameter 76 may include the outbreak of a war over which the General has military authority. Using these priority parameters 60, in one embodiment of system 10, priority level 54 for the General for the military plane would be high. However, small changes in the priority parameters 60, may cause different results. For instance, if identification 64 was not for the General, but for a civilian reporter, priority level 54 for the civilian reporter for the military plane may be lower than the priority level 54 for the General for the military plane.

In one embodiment, priority level 54 for user 12 may be further determined based on the history of the user 12. For example, if the user 12 previously abused the auctions of system 10, priority level 54 for the user 12 may be reduced to make it harder for the user 12 to win auctions.

At step 312 of FIG. 2A, a bid rate interval is calculated. In the illustrated embodiment, a bid rate interval is capable of allowing for the regulation of time between successive bids made by each user 12. In one embodiment, a bid rate interval may be calculated using at least the priority level 54 for each user 12. Therefore, in one embodiment, a high priority level 54 may cause a short bid rate interval to be calculated, allowing more frequent bids than longer bid rate intervals would allow. To the contrary, a low priority level 54 may cause a long bid rate interval to be calculated. Using the previous example, the General, with a high priority level, may be calculated to have a short bid rate interval while the civilian reporter, with a low priority level, may be calculated to have a long bid rate interval.

At step 316, the time between successive bids is regulated. In the illustrated embodiment, regulating the time between successive bids allows for the changing of the amount of opportunities user 12 has to bid on resource 26 within a set time. In one embodiment, by regulating the time between successive bids for each user 12, a user 12 may be allowed to bid on resources 26 more often than other users 12, enabling the user 12 to have more opportunities bid and increasing the chances that the user 12 will win the auction for resources 26. In a further embodiment, regulating the time between successive bids may restrict a user 12 to bidding on resources 26 less often than other users 12. Therefore, the user 12 may have less chances of winning the auction for resources 26.

In one embodiment, regulating the time between successive bids made by user 12 may further allow a user 12 to make a bid on resources 26 before the bid rate interval for the same user 12 allows a successive bid. For example, when a user 12 makes a bid before a successive bid is allowed, the bid is held until the successive bid is allowed. In one embodiment, this allows a user 12 to enter a bid before a successive bid is allowed. Additionally, in a further embodiment, a user 12 may make multiple bids before a successive bid by the user 12 is allowed. When multiple bids are made before a successive bid is allowed, in one embodiment, the last bid made before the successive bid is allowed is the bid that is entered. This may allow a user 12 to change a bid made before a successive bid is allowed.

In one embodiment, the regulation of time between successive bids may be achieved using at least the bid rate interval. Therefore, in one embodiment, a short bid rate interval may correlate to a small amount of time between successive bids. On the other hand, a long bid rate interval may correlate to a large amount of time between successive bids. For example, according to the previous example, the General was calculated to have a short bid rate interval and therefore, may have a small amount of time between successive bids. By allowing a small amount of time between successive bids, the General may submit more bids than the civilian reporter within the same time period. In one embodiment, this may allow the General to have a greater chance to win the auction for the military plane.

According to an alternate embodiment of FIGS. 2A and 2B, the method of system 10 may further allow the bidding process to be divided into multiple phases. For example, the first phase may comprise a pre-bid where users 12 may submit bids on resources 26 with the submitted bids lacking any obligation. The pre-bid phase may allow users 12 to act out a sample auction for resources 26, giving users 12 an idea of the approximate bid required to win the auction and resources 26. The pre-bid phase may be followed by an additional phase that includes the official bidding process. The official bidding process may determine the actual winner of the auction and resources 26.

FIG. 3 is a flowchart describing a method of an alternative embodiment of system 10 in which system 10 is used to conduct an auction where a maximum bid is determined for each user 12. According to the illustrated embodiment, the method of system 10 includes setting up an auction, allowing connections to the auction, determining a priority level, calculating a maximum bid, and restricting the bid to only one bid, the only bid being the calculated maximum bid. The example acts may be performed by auctioneer 22, as discussed above with reference to FIGS. 1A and 1B, user agent 14, or by any other suitable device.

At step 400, an auction is set up. For example, the auction is established so as to accept bids for the use of resources 26. In one embodiment, the bidding process is set up for a limited amount of time, at the end of which, the highest bid wins the auction and resources 26.

At step 404, connections to an auction are allowed. For example, these connections may be made through network 18. Additionally, these connections are allowed in order for user 12 to bid on resources 26 in an auction.

At step 408, a priority level is determined. The priority level may be used to calculate a maximum bid for user 12. In one embodiment, the priority level is determined using the identification of user 12. The identification of user 12 may refer to any data operable to allow user 12 to be appropriately identified. For example, the identification of user 12 may include an IP address, a military rank, a social security number, a security clearance level, or a level of political office held by the user 12 of each user agent 14. In the illustrated embodiment, the identification of user 12 includes a rank in the military.

In one embodiment, a user 12 with an identification corresponding to a high level of importance may be determined to also have a high priority level. Thus, referring to the previous example, a General in the military may be identified to have a higher level of importance than a civilian reporter. Therefore, the General may have a higher priority level.

At step 412, a maximum bid is calculated. Step 412 involves calculating a maximum bid for a combination of a user 12 and a resource 26. Thus, a specific user 12 may have a higher maximum bid for one resource 26 than another resource 26. A maximum bid, in one embodiment, is the only bid user 12 is allowed to make for resources 26. In one embodiment, the maximum bid of user 12 is calculated using the priority level for user 12 and one or more bid parameters. A bid parameter may include any suitable data used to calculate a maximum bid. For example, the bid parameter may include a need of user 12 for resources 26, a task of user 12 for resources 26, and one or more world events at the time of the auction.

A need of user 12 may refer to the amount of need user 12 has for resources 26. In one embodiment, the need of user 12 may include any system operable to gauge the value of the need of user 12 for resources 26. For example, the need of user 12 may include a numbering system made up of numbers 1-10; the number 1 symbolizing an immediate need for resources 26, and the number 10 symbolizing no immediate need for resources 26. In the illustrated embodiment, each user 12 determines their own need for resources 26.

A task of user 12 may refer to any objective user 12 has for resources 26. For example, the task of user 12 may include taking a picture, flying a route, or compiling data. In the illustrated embodiment, the task of user 12 includes a military objective. For instance, the task of user 12 includes scanning a proposed battlefield for possible threats. In the illustrated embodiment, the task of user 12 may further include details such as the duration of time user 12 needs resources 26, the area where user 12 intends to use resources 26, or the reason user 12 needs resources 26. Additionally, in the illustrated embodiment, each user 12 determines their own task for resources 26.

World events may refer to any significant world event occurring at the time the auction takes place. For example, world events may include a war, a coup, a political event, or a natural disaster. In one embodiment, when the task of user 12 corresponds with world events, user 12 may receive a higher maximum bid. Likewise, when the task of user 12 does not correspond with world events, user 12 may receive a lower maximum bid.

In a further embodiment, the bid parameter may include any other suitable parameter. For example, the bid parameter may include a proximity parameter. A proximity parameter may refer to the distance between user 12 and resources 26. In one embodiment, when user 12 is close in proximity to resources 26, user 12 may receive a high maximum bid. Alternatively, when user 12 is not close in proximity to resources 26, user 12 may receive a low maximum bid.

In the illustrated embodiment, the calculation of the maximum bid for user 12 may further include a formula whereby the bid parameters may carry greater weight than the priority level for each user 12. Therefore, a user 12 with a low priority level could still have the highest maximum bid if the bid parameters of user 12 were high.

For instance, using the previous example, the maximum bid of a General, having a high priority level, may be low if the General's need for the military plane was not immediate, the General's task for the military plane was performing in an air show, and world events occurring at the time of the auction included the outbreak of a large war. To the contrary, the maximum bid of a civilian reporter, having a low priority, may be high if the civilian reporter's need for the military plane was immediate, the civilian reporter's task for the military plane was to rescue injured civilians and soldiers out of an area of war, and world events occurring at the time of the auction included the outbreak of the war where the civilians and soldiers were injured.

In a further embodiment, the maximum bid for user 12 may be further determined based on the history of the user 12. For example, if the user 12 previously abused the auctions of system 10, the maximum bid for the user 12 may be reduced to make it harder for the user 12 to win auctions.

At step 416, the bid for one or more resources is restricted to only one bid, the only one bid being the maximum bid calculated. For instance, from the previous example, both the civilian reporter and the General would be restricted to bidding only once on the military plane. Furthermore, the one bid allowed for both the civilian reporter and the General would be restricted to their respective calculated maximum bid. In one embodiment, by restricting the bid to only one bid and restricting that bid to only the maximum bid, the maximum bid would always be submitted and, if compared by highest amount, the highest maximum bid would win the auction for resources 26. Therefore, in one embodiment, the civilian reporter would win resources 26 despite having a lower priority level than the General. In a further embodiment, the winning bid for resources 26 may be determined in other ways, allowing both the General and the civilian reporter opportunity to win resources 26.

In a further embodiment, the bid for one or more resources may not be restricted to only one bid. For example, if the maximum bid for user 12 changes before the auction for resources 26 ends, user 12 may be allowed to resubmit their maximum bid. In one embodiment, allowing multiple bids allows user 12 to change their bid parameters, such as the need parameter and proximity parameter, to increase their maximum bid. For example, after submitting a maximum bid, the situation of user 12 may change, causing the need of user 12 for resources 26 to increase. As a result, user 12 may increase the need parameter to cause the maximum bid of user 12 to also increase. With a new maximum bid, user 12 may substitute the new maximum bid for the previous maximum bid.

In an embodiment not illustrated, user agent 14 is further capable of connecting, using network 18, with another user agent 14 in order to communicate the desire of a user 12 to trade with another user 12. For example, a user 12 with a low priority level may trade with a user 12 with a high priority level. Thus, under the trade agreement made, the user 12 with a high priority level would bid on the resources 26 desired by the user 12 with a low priority level. When the user 12 with a high priority level wins the auction and the resources 26, the user 12 with the high priority level may trade the resources 26 to the user 12 with a low priority level in exchange for an agreed upon fee. In one embodiment, the ability to trade allows users 12 to use resources 26 despite a low priority level.

In another embodiment, when users 12 bid on resources 26, each user 12 automatically agrees to a canceling fee. Likewise, the owner of resources 26, by allowing resources 26 to be auctioned, automatically agrees to a canceling fee. In one embodiment, the canceling fee allows user 12 to be compensated in case the owner of resources 26 cancels the obligation in the auction. The owner of resources 26 may cancel the previous obligation, for example, if the resources 26 are needed elsewhere. Upon canceling the previous obligation, the owner of the resources 26 may incur an obligation to pay the canceling fee to the user 12 who won the resources 26 in an auction as compensation for not receiving the resources 26.

In a further embodiment, the canceling fee agreed upon by the user 12 and the owner of resources 26 may be waived if a third party satisfies the obligation of the party that cancelled the obligation. For example, if a user 12 was willing to pay the bidding price of a canceling user 12 in order to use resources 26, the user 12 would become the new winner of the resources 26, and the canceling user 12 may be required to pay a fee, lower than the canceling fee, to the user 12 willing to satisfy the obligation.

Although this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A computer-implemented method for conducting an auction, comprising:
   allowing one or more bidders to each bid on one or more resources;
   for each of the bidders,
     determining a priority level;
     calculating, using at least the determined priority level, a bid rate interval; and
     regulating, by a computer system, the relative likelihood of the bidder winning the auction by regulating, based at least on the calculated bid rate interval, the time between successive bids on the one or more resources made by the bidder, wherein the time between the successive bids is regulated to be shorter for a higher priority level bidder than for a lower priority level bidder.

2. The method of claim 1, further comprising:
   for each of the bidders, restricting the amount of each bid on the one or more resources made by the bidder from being higher than a maximum bid increment.

3. The method of claim 1, wherein determining a priority level comprises:
formulating a result using one or more priority parameters, the priority parameters comprising:
a respective identification of the bidder;
a need of the bidder for the one or more resources, the need of the bidder being determined by the respective bidder;
one or more world events at the time of the auction;
a task of the bidder for the one or more resources, the task of the bidder being determined by the respective bidder; and
a distance between the one or more resources and the bidder.

4. The method of claim 1, wherein allowing one or more bidders to each bid on one or more resources comprises allowing one or more bidders to each bid on a temporary use of one or more sensors.

5. The method of claim 1, wherein the one or more resources comprise one or more military sensors.

6. Logic encoded in non-transitory computer-readable medium, the logic being operable, when executed on a processor, to:
allow one or more bidders to each bid on one or more resources;
for each of the bidders,
determine a priority level;
calculate, using at least the determined priority level, a bid rate interval; and
regulate the relative likelihood of the bidder winning the auction by regulating, based at least on the calculated bid rate interval, the time between successive bids on the one or more resources made by the bidder, wherein the time between the successive bids is regulated to be shorter for a higher priority level bidder than for a lower priority level bidder.

7. The logic of claim 6, wherein the logic is further operable to:
for each of the bidders,
restricting the amount of each bid on the one or more resources made by the bidder from being higher than a maximum bid increment.

8. The logic of claim 6, wherein the logic is further operable to determine a priority level for each of the bidders by formulating a result using one or more priority parameters, the priority parameters comprising:
a respective identification of the bidder;
a need of the bidder for the one or more resources, the need of the bidder being determined by the respective bidder;
one or more world events at the time of the auction;
a task of the bidder for the one or more resources, the task of the bidder being determined by the respective bidder; and
a distance between the one or more resources and the bidder.

9. The logic of claim 6, wherein the logic operable to allow one or more bidders to each bid on one or more resources comprises the logic operable to allow one or more bidders to each bid on a temporary use of one or more sensors.

10. A computer-implemented method for conducting an auction, comprising:
allowing one or more bidders to each bid on one or more resources during a single auction;
for each of the bidders,
determining a priority level;
calculating, using at least the determined priority level, a bid rate interval; and
regulating, by a computer system, the relative likelihood of the bidder winning the single auction by regulating, based at least on the calculated bid rate interval, the time between successive bids on the one or more resources made by the bidder during the single auction, wherein the time between the successive bids is regulated to be shorter for a higher priority level bidder than for a lower priority level bidder.

* * * * *